United States Patent
Willis et al.

(10) Patent No.: US 8,902,158 B2
(45) Date of Patent: Dec. 2, 2014

(54) MULTI-USER INTERACTION WITH HANDHELD PROJECTORS

(75) Inventors: Karl Darcy Daniel Willis, Pittsburgh, PA (US); Ivan Poupyrev, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 321 days.

(21) Appl. No.: 13/278,974

(22) Filed: Oct. 21, 2011

(65) Prior Publication Data

US 2013/0100009 A1    Apr. 25, 2013

(51) Int. Cl.
| | |
|---|---|
| *G09G 5/00* | (2006.01) |
| *H04N 9/31* | (2006.01) |
| *G06F 3/042* | (2006.01) |

(52) U.S. Cl.
CPC ............ *G06F 3/0425* (2013.01); *H04N 9/3179* (2013.01); *H04N 9/3147* (2013.01); *H04N 9/3194* (2013.01)
USPC ............................... 345/156; 352/41; 353/18

(58) Field of Classification Search
USPC ......... 345/156–163; 455/556.1; 348/159, 745
See application file for complete search history.

(56) References Cited

U.S. PATENT DOCUMENTS

| | | | |
|---|---|---|---|
| 6,764,185 B1 | 7/2004 | Beardsley et al. | |
| 2004/0239653 A1* | 12/2004 | Stuerzlinger | 345/183 |
| 2010/0317399 A1* | 12/2010 | Rodriguez | 455/556.1 |
| 2011/0109560 A1 | 5/2011 | Carvajal et al. | |
| 2011/0228175 A1* | 9/2011 | Nicoli et al. | 348/745 |

OTHER PUBLICATIONS

Karl D D Willis et al: "SideBySide", User Interface Software and Technology, ACM, 2 Penn Plaza, Suite 701, New York, NY; Oct. 16, 2011, pp. 431-440.
European search report for application No. 12189305.1 dated Oct. 4, 2013.

* cited by examiner

*Primary Examiner* — Premal Patel
(74) *Attorney, Agent, or Firm* — Patterson + Sheridan, LLP

(57) ABSTRACT

A device-mounted infrared (IR) camera and a hybrid visible/ IR light projector may be used to project visible animation sequences along with invisible (to the naked eye) tracking signals, (e.g. a near IR fiducial marker). A software (or firmware) platform (either on the handheld device or to which the device communicates) may track multiple, independent projected images in relation to one another using the tracking signals when projected in the near-IR spectrum. The resulting system allows a broad range of new interaction scenarios for multiple handheld projectors being used in any environment with adequate lighting conditions without requiring the environment to be instrumented in any way.

26 Claims, 9 Drawing Sheets

MULTI-USER INTERACTION WITH HANDHELD PROJECTORS

BACKGROUND

1. Field of the Invention

Embodiments of the invention relate to handheld projectors. More particularly, embodiments provide a device-mounted camera and a hybrid visible/infrared light projector configured to track multiple independent projected images in relation to one another.

2. Description of the Related Art

Over the last decade, image projection systems have been developed that are small enough to fit comfortably within a person's hand. Such devices (sometimes referred to as pocket projectors or mobile projectors or pico projectors) provide a handheld device that can project images onto any nearby viewing surface.

Additionally, a handheld projector can be connected to (or integrated with) other portable devices such as mobile phones, personal digital assistants, and digital cameras. Handheld devices such as these provide sophisticated computing platforms, complete with large display areas, touch sensitive surfaces and cameras, among other components. Further, the computing power of these devices has steadily increased; allowing sophisticated computing applications to be executed from the palm of one's hand. For example, handheld devices now frequently include computing hardware capable of rendering 3D graphics images in real time, and a variety of rendering applications are available for handheld devices. Handheld projectors can be connected to (or integrated with) these types of portable devices. When combined with (or connected to a computing system) a handheld projector can project any image generated by the handheld device onto a viewing surface.

The relatively large size of projected images allows them to be easily seen by multiple users. However, allowing two devices (and projected images) to interact with one another has typically required a controlled environment. For example, one published approach has been to attach a number of retroreflective markers to a handheld projector, which are then tracked by the motion capture system installed in the environment. Alternatively, another approach has been to instrument the environment (e.g., with markers visible to a sensor on the handheld device). Both approaches rely on the handheld projected being used within the controlled environment.

SUMMARY

One embodiment of the invention provides a computer-implemented method for presenting display frames projected using a first handheld projector. This method my generally include, generating a first display frame depicting a visible image to project from the handheld projector and at least a first tracking signal to composite with the first display frame, projecting the first display frame composited with at least the first tracking signal onto a display surface, and detecting at least a second tracking signal within a field of view of a sensor on the handheld projector. The second tracking signal is projected on the display surface by a second handheld projector. This method may further include determining, from the first and second tracking signals, a relative position of the first display frame and a second display frame and generating one or more subsequent display frames to project from the first handheld projector. Each subsequent display frame includes at least the first tracking signal. Also, the subsequent display frames are responsive, at least in part, to the relative positions of the first and second tracking signals.

Still another embodiment of the invention includes a method for multi-user interaction with handheld projectors. This method may generally include projecting, by at least a first handheld projector, a first set of display images on a projection surface and projecting, by the first handheld projector, a tracking signal on the projection surface. The tracking signal is imperceptible to viewers of the set of display images projected by the first handheld projector. A second handheld projector projects a second set of display images on the projection surface. The second handheld projector is configured to detect the tracking signal projected by the first handheld projector.

Other embodiments include, without limitation, a computer-readable medium that includes instructions that enable a processing unit to implement one or more aspects of the disclosed methods as well as a system configured to implement aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Handheld computing devices have become an ubiquitous part of modern life. These devices allow people to communicate, retrieve and record information, view and create content, as well as both work and play games in any location. Interaction with these handheld computing devices, however frequently remains a solitary, single user experience, where a user stares at a screen in their hand. Handheld projectors (in conjunction with a computing system) provide devices that are sufficiently small to be grasped in a single hand and light enough to be moved from place to place. Multiple users can project digital content directly into the physical environment. The relatively large size of projected images allows them to be easily seen by multiple users, making them a particularly natural fit for co-located multiuser interaction scenarios.

Embodiments of the invention provide a handheld device which combines a device-mounted camera with both visible and infrared light projectors. The visible projector is used to project viewable images for an audience of users. The infrared projectors are used to project invisible (to the naked eye) images that are nevertheless visible to the device mounted camera (e.g., an infrared sensor). The near infrared (IR) fiducial markers allow each device to track multiple independent projected images in relation to one another. For example, the markers can be tracked by each projector and registered to calculate the size, location and orientation of each projected image in the scene relative to each other. Using this information interactive applications can be developed that are aware of the overall spatial configuration of projected images and can react to each other by changing projected visible content, e.g. character animation. The markers can include both static markers—used as a reference for each projection frame—and event driven—used to communicate events among the handheld projectors.

Figure 1A:
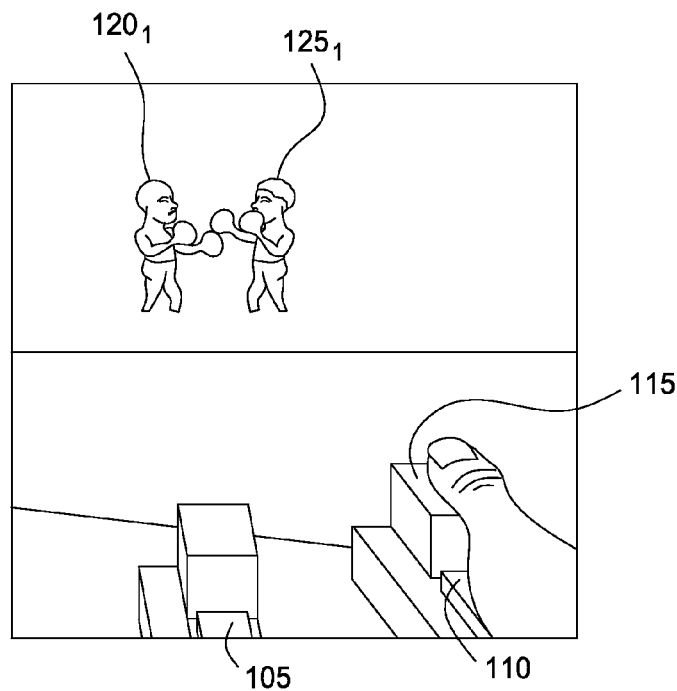
FIGS. 1A-1B illustrate an example of multiple users interacting with one another using handheld projection devices, according to one embodiment of the invention.
Figure 1B:
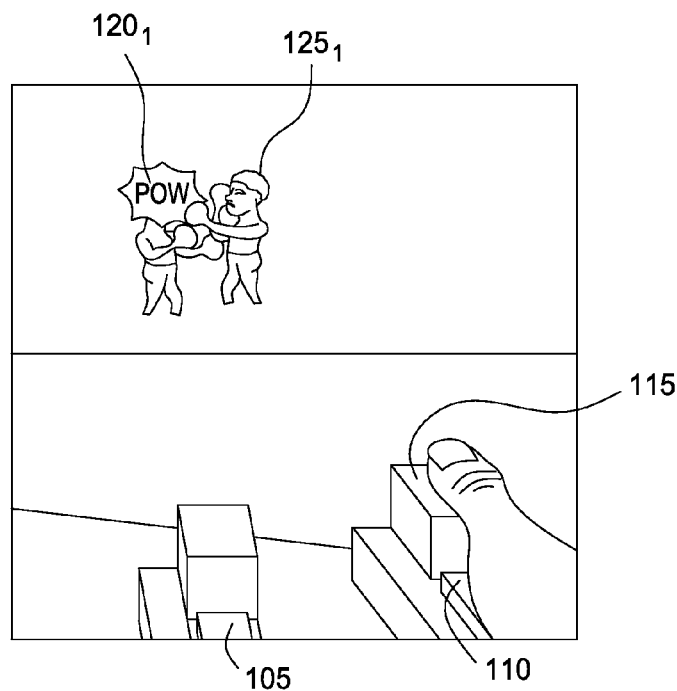

For example, FIGS. 1A-1B illustrate an example of multiple users interacting with one another using handheld projection devices, according to one embodiment of the invention. As shown, a projector 105 projects an image $120_1$ and a projector 110 projects an image $125_1$. Illustratively, the images $120_1$, $125_1$ each show a boxer. In addition to the visible image of the boxing characters, display images $120_1$, $125_1$ projected by the projectors 105 and 110 may each include an invisible (again, to the naked eye) fiducial marker. Assume for this example, that the projected images create an animation of the boxing characters "bobbing and weaving" around one another. Further, each device 105, 110 can detect the marker it projects, as well as markers projected by the other device 105, 110. In turn, device 105, 110 may use these markers as a reference marker to determine the relative position of the projection frames projected by devices 105, 110. Thus, the devices 105, 110 can determine the relative position of the boxing characters in the distinct projection frames.

Further, devices 110, 115 may include a variety of control mechanisms, e.g., a button, joystick, touch screen/surface, etc. For example, as shown, device 105 includes a button 115. When the user of device 110 presses the button 115, the projection device 110 may be configured to animate the boxing character throwing a punch. This result is shown in FIG. 1B, where the image projected by device 110 shows an image $125_2$. Further, in addition to the visible image $125_2$, the device 110 may project a fiducial marker (referred to as an "event marker")—in addition to projecting the static or reference marker. The event marker projected by device 110 informs device 105 that the animated character 125 has thrown a punch. In this example, the device 105 responds by determining the relative position of the characters in the projection frames, and if in the "correct" relative position animates the character projected by projector 105 as being hit by the punch. Image $120_2$ shows this result, where the projected image of the boxer includes the carton text bubble with the word "pow." As this relatively simple example demonstrates, embodiments of the invention provide an approach where independent projection devices can communicate via invisible fiducial markers without requiring instrumentation of the environment. Therefore, embodiments described herein system can be used practically anywhere with suitable lighting conditions.

More generally, embodiments of the inventor provide a system designed for ad-hoc multi-user interaction with handheld projectors which do not require an instrumented environment and can be used almost anywhere. Each projector projects two information streams—one that provides display images for a viewer (e.g., the boxers in FIGS. 1A and 1B. A second communications stream which allows each projector to track the display frames projected by others as to communicate the occurrence of events relevant for a given application (e.g., that one animated boxer has attempted to throw a punch at another). That is, each projector uses the second communication stream to encode and decode messages about the projection frames and program events that occur while users interact with the handheld projectors.

Importantly, the second information stream may be projected in a manner that is imperceptible to the viewers of the projection images. That is, the second information stream may be generally invisible to the naked eye. For example, in one embodiment, a device-mounted infrared (IR) camera and a hybrid visible/IR light projector is used to project visible animation sequences along with invisible fiducial markers. A software platform (either on the handheld device or to which the device communicates) may track multiple, independent projected images in relation to one another using the invisible fiducial markers projected in the near-IR spectrum. The resulting system allows a broad range of "side-by-side" interaction scenarios where users are not tied to a fixed location. For example, "side-by-side" applications may be used to exchange digital content, such as personal contact information or media files, can be initiated without any infrastructure. Similarly, multiple users can play projected "side-by-side" games together by creating ad-hoc gaming spaces. Other "side-by-side" applications include Interaction scenarios for education, allowing teachers and students to study together using a shared information space.

In addition to the near IR markers, the tracking signals could also be generated using ultraviolet (UV) markers imperceptible to the viewers. Similarly, the projected display images could be modified to include tracking signals, such as tracking signals encoded using steganographic techniques or tracking signals encoded in temporal light pulses.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Further, embodiments are generally described herein relative to a projection system integrated with a handheld computing device executing a program configured to respond to user movements and gestures. However, one of ordinary skill in the art will recognize that embodiments of the invention may be implemented in variety of ways. For example, the computing system need not be integrated with the handheld projector, but could communicate over wireless (or wired) communication networks. Additionally, embodiments are sometimes described relative to a "character" within a projection frame (which may or may not be an avatar under direct control of a user via the handheld projector). However, more generally, any projected object in the projection frame (e.g., projected symbols, shapes, images, vehicles, animals, etc.) can be controlled using the gestural input techniques described herein. Further still, such a projection frame may be used to generate two or three dimensional images.

Lastly, while examples embodiments are described below as projecting the fiducial markers in the near IR spectrum—so as to be imperceptible to viewers, other approaches for projecting the markers may be used. For example, the markers could be projected using steganographic techniques to embed the fiducial markers in the visible images. Similarly, the projection could also be UV markers imperceptible to viewers. Further, the markers themselves may be implemented as bar codes, QR-codes, or any other suitable marking technique used to "paint" invisible markers in a projection image that can be detected, recognized, and interpreted by computer code generating the display frames projected by the handheld projection devices. As an example, the fiducial markers described below employ an augmented reality tag (AR tag) using a 64×64 grid of points that can either be illuminated in the marker or not (resulting in 4096 distinct possible markers). Further, embodiments of the invention are described relative to a number of interactive scenarios using two handheld projection devices. However, one of ordinary skill in the art will readily recognize that the approaches described herein may readily be extended for use with larger numbers of handheld projection devices.

Figure 2:
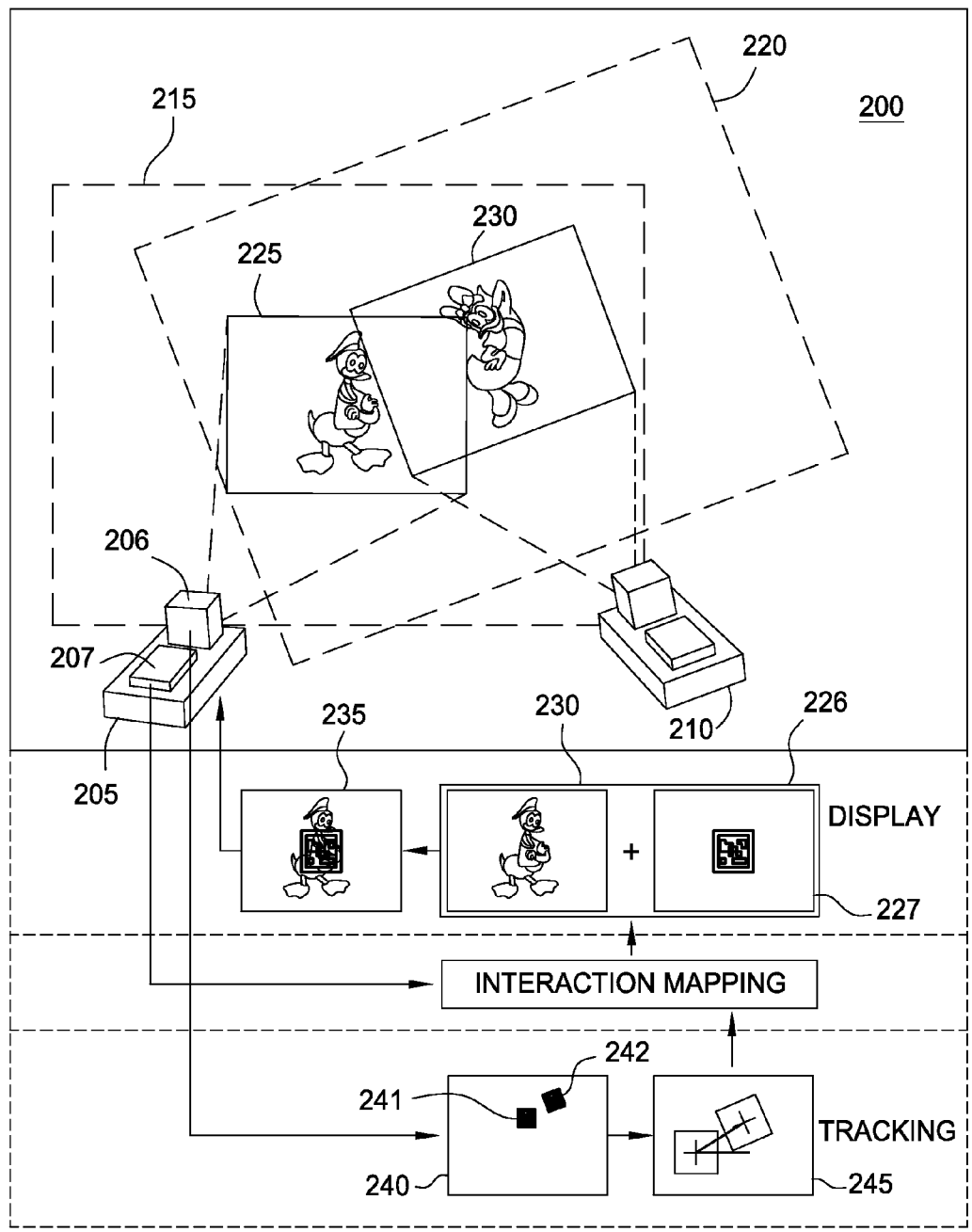
FIG. 2 further illustrates an example of multiple users interacting with one another using handheld projection devices, according to one embodiment of the invention.

FIG. 2 illustrates an example of multiple users interacting with one another using handheld projection devices, according to one embodiment of the invention. As shown, a projection environment 200 includes a projection frame 225 projected by a projector 205 and a projection frame 230 projected by a projector 210. Projector 205 also includes a camera 206 that has a field of view 215. Projector 210 includes a camera having a field of view 220. Illustratively, the image projected by device 210 (projection frame 230) is within the field of view of camera 206, and vice-versa. That is, the camera on each device 25, 210 can "see" the projection frame of the other.

In one embodiment, the projectors 205, 210 each project a near IR image of a fiducial marker in the projection frame 225, 240—in addition to the visible display images. For example, IR image 226 represents a reference marker 227 used to identify device 205 in each projection frame. The reference marker 227 may be projected in the center of each display frame projected by device 205. In one embodiment, the projector 205 composites the IR image 226 with the visible image 230 to create a blended image 235, projected as projection frame 225.

Further, because the projection frames 225, 230 are both within the field of view 215 of camera 206, the near IR markers in these projection frames may be detected by the sensor unit 207 on device 205 (in this example an IR sensor). For example, detected IR image 240 shows markers 241 and 242 detected by the sensor 207. The marker 241 corresponds to the marker 227 in IR image 226. In one embodiment, the projector 205 may be configured to determine the size, position, and orientation of the projection frame 225 from this reference marker.

Illustratively, the marker 242 corresponds to a near IR marker embedded in projection frame 230 by projector 210. As this marker is within the field of view 215 of projector 205, this projector may also be configured to determine the size, position, and orientation of the projection frame 230. For example, tracking data 245 shows the derived relative positions of the two frames. In one embodiment, the components of device generating the visible images 230 (i.e., the projected animation) may be responsive to the relative position of the reference markers, i.e., to the tracked positions of the two projection frames. For example, as shown in projection environment 200, the eyes of the cartoon characters in projection frames 225 and 230 may be configured to generally follow the position of the other character as users move the projection frame from one position to another.

Figure 3:
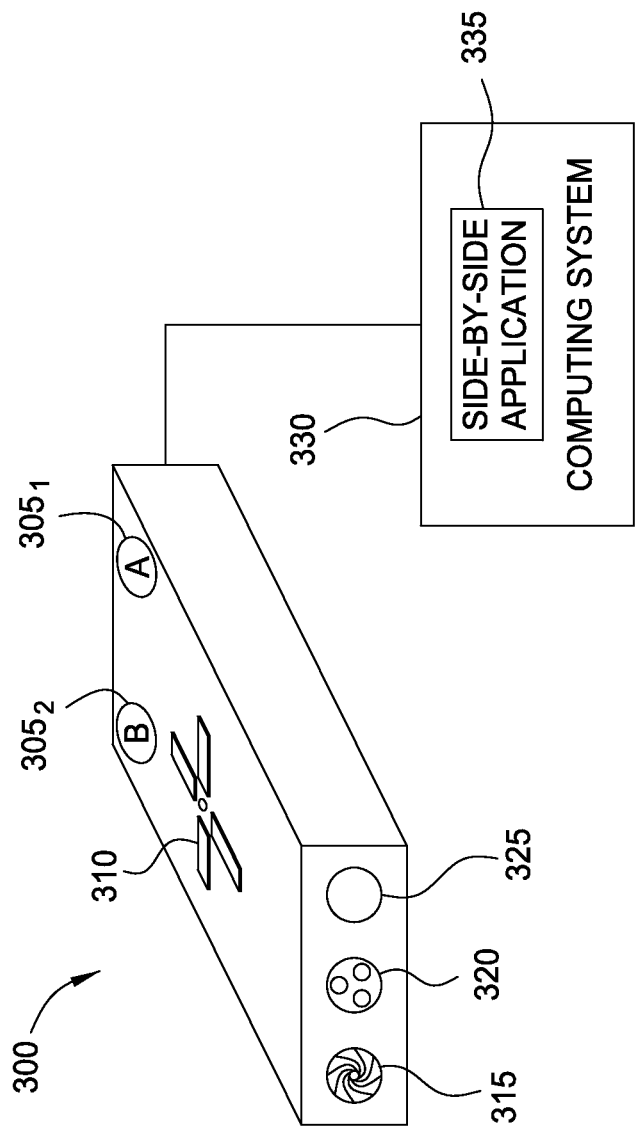
FIG. 3 illustrates an example of a handheld projection device, according to one embodiment of the invention.

FIG. 3 illustrates an example of a handheld projection device 300, according to one embodiment of the invention. As shown, handheld projection device 300 includes a camera 315, an RGB projector 320, and an IR projector 315, and IR sensor 325. The handheld projection device 300 may also include a variety of interface control elements. In this example, the handheld projection device 300 includes a directional keypad 310 and two buttons 305-12 (labeled "A" and "B"). Of course, other mechanisms could be used such as a joystick or a display screen surface presenting touch-sensitive icons or controls. In addition, the handheld projection device 300 may be connected to (or integrated with) a computing system 330.

The computing system 330 executes a side-by-side application 335. Computing system 330 is included to be representative of a variety of computing devices; including, e.g., desktop computers, laptop computers, computing tablets, video game consoles, etc. Accordingly, computing system 335 may include components such as a processor, memory, and storage used to store, load, and execute side-by-side application 335 in conjunction with handheld projection device 300. Computing system 335 may also include a variety of well known peripherals, e.g., a network interface, keyboard, display, mouse, etc.

In one embodiment, the side-by-side application 335 is configured to generate the visible display images projected by RGB projector 320. In addition, the IR projector 315 may be configured to project a tracking signal (e.g., a reference marker) generated by the side-by-side application 335. Such a reference marker may projected by the IR projector 315 along with the display images projected by RGB projector 320. The reference marker encodes a tracking signal visible the projectors but generally imperceptible to the users. The IR sensor 325 may detect the reference marker sent by the handheld projection device 300, along with any event markers projected by the handheld projection device 300. Further, the IR sensor may detect any fiducial markers projected by other handheld devices. The sensed markers may be transmitted to the side-by-side application 335. The side-by-side application may respond to the relative position, presence, absence, of the markers projected by device 300 (and other handheld projection systems) to provide a rich interactive experience for the users controlling such handheld projection systems.

Figure 4:
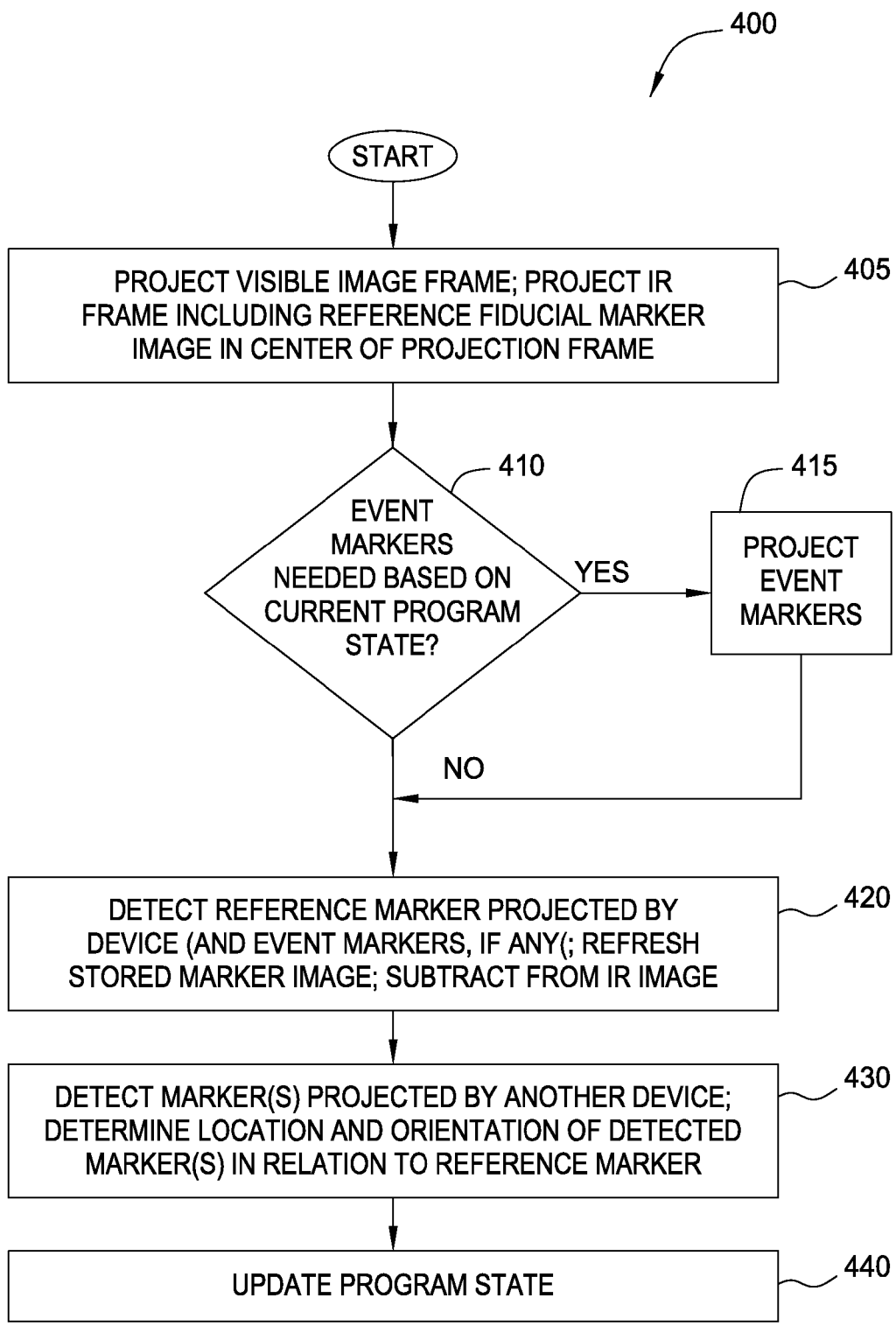
FIG. 4 illustrates a method for a handheld projector to project, detect and respond to near IR fiducial markers in image frames, according to one embodiment of the invention.

For example, FIG. 4 illustrates a method 400 for a handheld projector to project, detect, and respond to near IR fiducial markers in image frames, according to one embodiment of the invention. As shown, the method 400 begins at step 405, where a handheld projector projects a visible image frame composited with a near IR image. The near IR image provides a reference marker for that device. The visible projected image and the near IR image provide two independent communication streams to project from the device. One communication stream provides the content projected to viewers, i.e., the animated display images. The other communication stream may be generally imperceptible to the viewers and used to encode tracking signals about the projection frame and other events relevant for a given side-by-side application. While imperceptible to viewers, the second communication stream is visible to a sensor on the handheld projector (e.g., an IR or UV camera) which can observe and decode the tracking signals while users interact with the handled projectors.

The reference marker may be positioned in the center of the projection frame and used by the device to determine the position and size of the projection frame being projected by that device (for a given frame). Further, when the device detects the reference marker of another device, the relative position, size, and orientation of each projection frame may be determined. As noted, elements of the animation projected by the device may be responsive to the relative positions of the reference markers.

At step 410, the device may determine whether any event markers need to be projected, e.g., based on a current projection state. If so, at step 415, the event markers are projected. Like the reference marker, the event marker may be projected as a near IR image imperceptible to the viewers, but visible to an IR sensor on the handheld projection. For example, the device may include a button (or other physical or graphical control elements). In such a case, when the user presses the button, the device may project an event marker to indicate that the button has been pressed. Doing so effectively allows one handheld projection device to send a message visible to any other handheld projection device (provided the event marker is within the field of view of the IR sensor on such devices).

Figure 5:
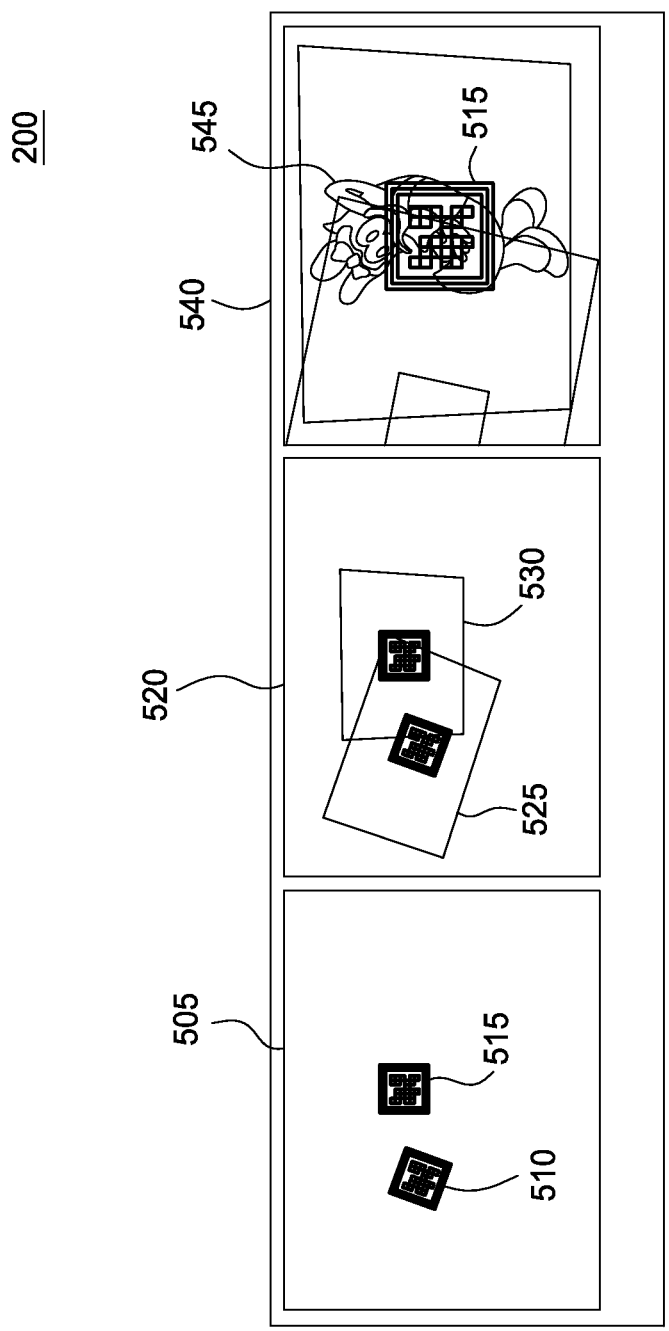
FIG. 5 illustrates an example of a visible projection image combined with near IR fiducial markers being used to control images projected by a handheld projector, according to one embodiment of the invention.

At steps 420 and 425, the handheld projection device detects the reference marker projected by that device and by other devices (and event markers, if any). For example, FIG. 5 illustrates an example of a visible projection image combined with near IR fiducial markers, according to one embodiment of the invention. As shown, an IR camera image 505 is generated by the sensor on a handheld device capturing an image of the projection view area, which includes the projection frame of the handheld devices, and the projection frames of other devices within the projection view area. The IR image 505 includes two fiducial markers 510 and 515.

In this example, markers 510 and 515 each correspond to a tracking signal projected by a different handheld projection device. Markers 510 and 515 are each at the center of a projection frame. Panel 520 shows a projection frame 525 corresponding to reference marker 510 and projection frame 530 corresponding to reference marker 515. By deriving the relative size, position, and orientation of the projection frames, one device can map the projection space of the visual images in the projection frames—allowing the animation of such elements to appear to respond to visual elements projected by another device. Panel 540 shows a visual animation 545 overlaid on the reference marker 515 as well as the boundary of the projection frame of the other handheld projection device.

Returning to the method 400, at step 420, the handheld device may subtract its own reference marker from the IR image (e.g., from IR image 505). Doing so may allow a first handheld projection device to view reference markers projected by a second handheld devices that overlap with the reference (or event) markers projected by the first handheld device. Because the IR light projected by each device is additive (that is, overlapping portions of the IR markers become brighter), the light contributed by a device's own projected reference marker(s) may be subtracted out. Doing so prevents such markers from interfering with the detection of markers projected by other devices.

Figure 6:
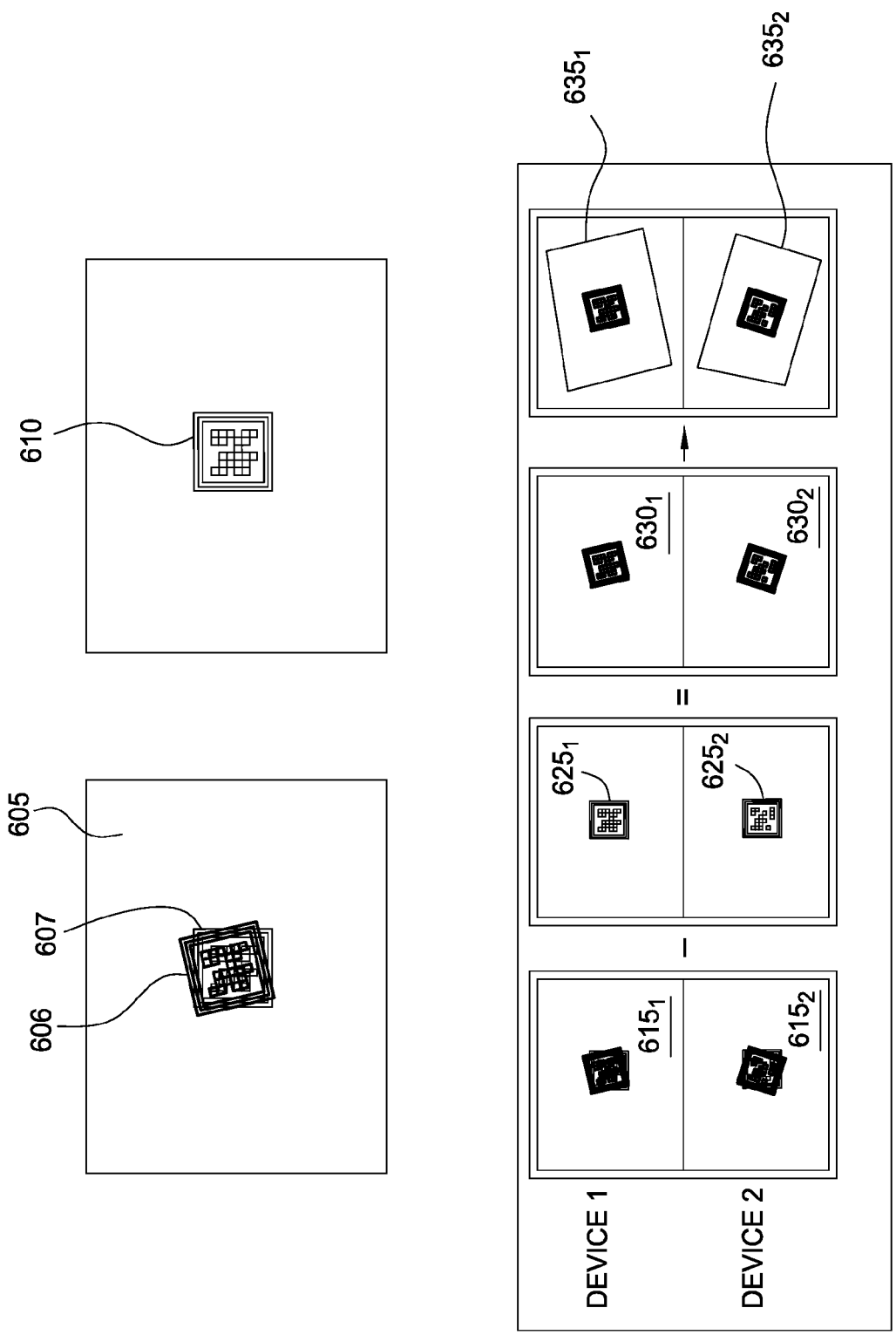
FIG. 6 illustrates an example of projected images with overlapping fiducial markers projected from multiple handheld projection devices, according to one embodiment of the invention.

For example, FIG. 6 illustrates near IR images projected from multiple handheld projection devices with overlapping fiducial markers, according to one embodiment of the invention. As shown in IR image 605, fiducial markers 606 and 607 overlap with one another. The handled devices cannot correctly identify either reference marker, due to the overlapping elements. However, as shown in panel 610 subtracting the fiducial marker 607 from IR image 605 leaves only marker 606 visible. Similarly, subtracting the fiducial marker 606 from IR image 605 would result in only marker 605 being visible.

More generally, unlike printed markers that are typically opaque, projected markers can overlap and still leave adequate information to identify each marker individually. The overlapping regions increase in brightness due to the additive nature of projected light, as shown in IR images $615_{1-2}$. In one embodiment, the reference marker projected in the middle of the frame by one device is known to and distinct from the reference markers of other handheld devices. By subtracting a stored marker image $625_{1-2}$ from the IR image, one device can recover the markers projected on top of it by other devices. As shown in subtracted IR images $630_{1-2}$. The recovered markers may then be identified and tracked, as shown in panels $635_{1-2}$.

One approach to marker subtraction is simply to store a static representation of the reference marker and subtract it form the center of the IR image of the projection frame. However, environmental conditions such as lighting and properties of the projection surface constantly change as users move through any given environment. Accordingly, in one embodiment, each device adapts to the changing environmental conditions by refreshing a stored image of the reference marker when there is no overlap, resulting in more robust performance. Note however, due to the close optical alignment of the camera and projector axes, projected images observed by the camera are relatively invariant to positional changes of the camera in relation to the projection surface. That is, even when a user points the device towards the projection surface at an acute angle, the projected markers appear relatively static and rectangular to the IR sensor. Accordingly, simply subtracting out the static representation of the reference marker may be adequate under many conditions.

Returning to the method 400, after the handheld projection device recovers the projection frame of other devices (and any event markers projected by such devices), the handheld projection device can update any program state information as appropriate for the given side-by-side application (step 425). For example, as shown in FIGS. 1A-1B, the projection device may update the image of a boxer when a boxer projected by another handheld device lands a punch—as determined from the relative position and orientation of the projection frames and the presence of an event marker indicating the user of the second handheld projection device has indeed thrown a punch. Additional examples of device/device interaction are provided below. The method 400 then returns to step 405, where the where the next display frame is generated and projected. This process generally continues until the users conclude interacting with one another via side-by-side applications running on the handheld projection devices.

Figure 7A:
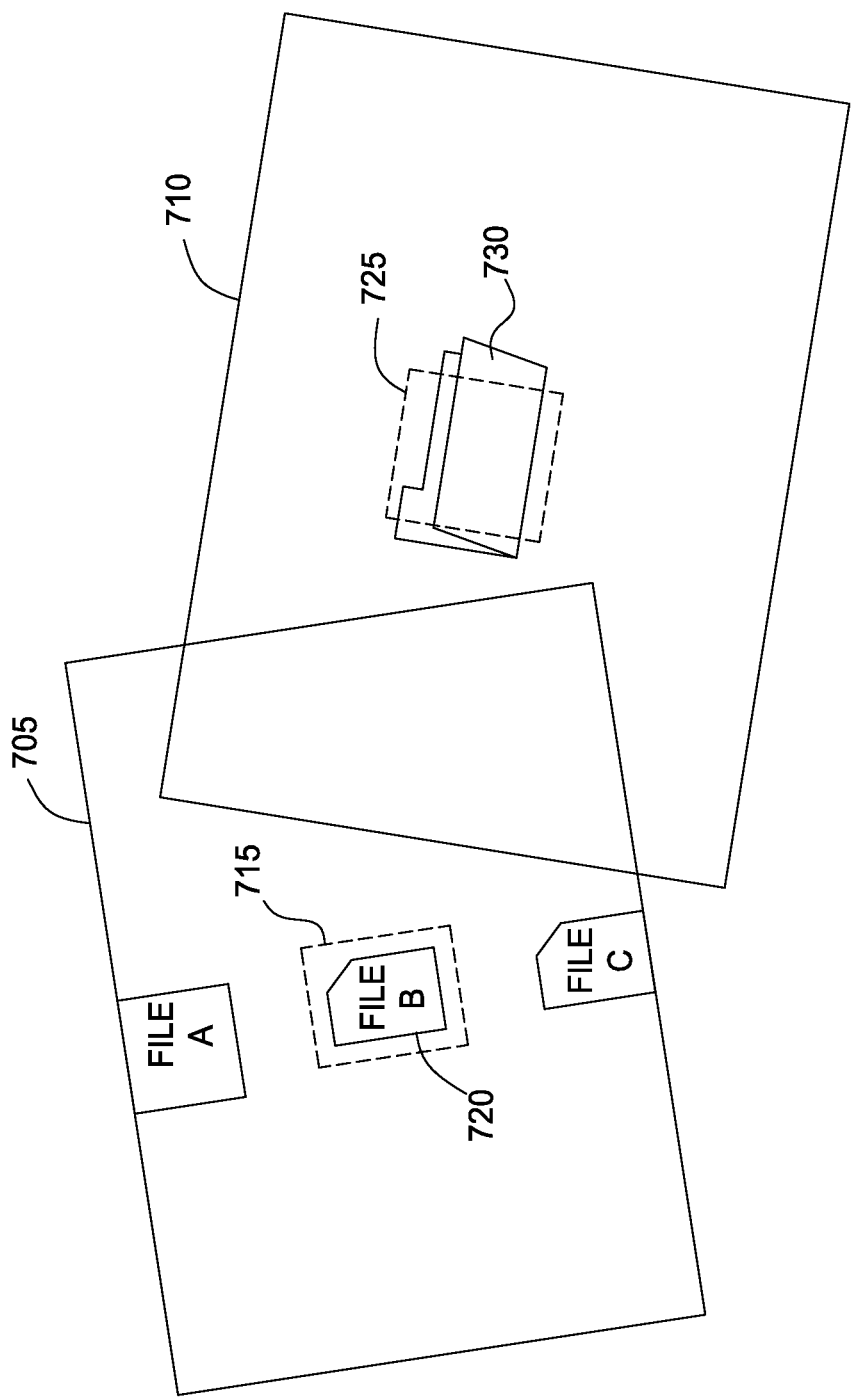
FIGS. 7A-7C illustrate additional examples of users interacting with one another using handheld projection devices, according to one embodiment of the invention.

A variety of side-by-side applications may be developed to take advantage of the techniques described above. For example, a "side-by-side" application could be configured to allow users to exchange digital content, such as personal contact information or media files. FIG. 7A shows an example of an interface for transferring files from one computing device to another. As shown, a user interacts with projection image 705 (projected using a first handheld projection device) to select a source file to transfer to a user controlling a second projection image 710. A projection image 705 includes a visual display of three files, where the currently selected file 720 is shown in the center of the projection image 705. Note, the projection image also includes a reference marker 715 at the center of the image. In this example, a user could press a button on the handheld projection device to scroll up or down in order to select another file. Alternatively, the handheld projection device could be configured to respond to gestures performed by the user holding the device. For example, the handheld projection device could include an inertial measurement unit (e.g., a set of accelerometers) configured to recognize a quick flicking motion up (or down) and respond by scrolling the files shown in the projection image. Of course, the gestures recognized by the handheld projector (and the response) may be tailored to suit a particular side-by-side application.

Once the first user has identified the file to transfer to another user, the first user positions the projected image of the selected file over the folder 730 depicted in projection image 710. Additionally, the projection image 710 includes an invisible (to the naked eye) reference marker 725. When the reference marker 715 overlaps with the reference marker 725, the first device and second device may respond by initiating a file transfer from one the first device to the second device. For example, the first device may transfer the file to the second device using FTP, HTTP, or a variety of other networking protocols.

A similar scheme could be used to allow users to exchange (or share) contact information. However, in addition to transferring data over a network connection, the contact information could also be exchanged by embedding it within the display image. For example, once the first user selected a desired contact to share (and drags the projection images to overlap), the first handheld projector could respond by generating and displaying an encoding of the contact information detected by the second handheld projector. The encoding could be a bar code, QR-code, etc. Further, such an encoding could be displayed in the visible projection image, but could also be projected in the near IR range, allowing it to be seen by the IR sensor on the receiving device. In such a case, the projected image could display a message indicating the transfer of information was complete. Note, this latter approach allows information to be exchanged without requiring any network (or other) direct communication between the sending and receiving devices. Instead, the complete interaction is mediated by the use of reference and event markers.

Figure 7B:
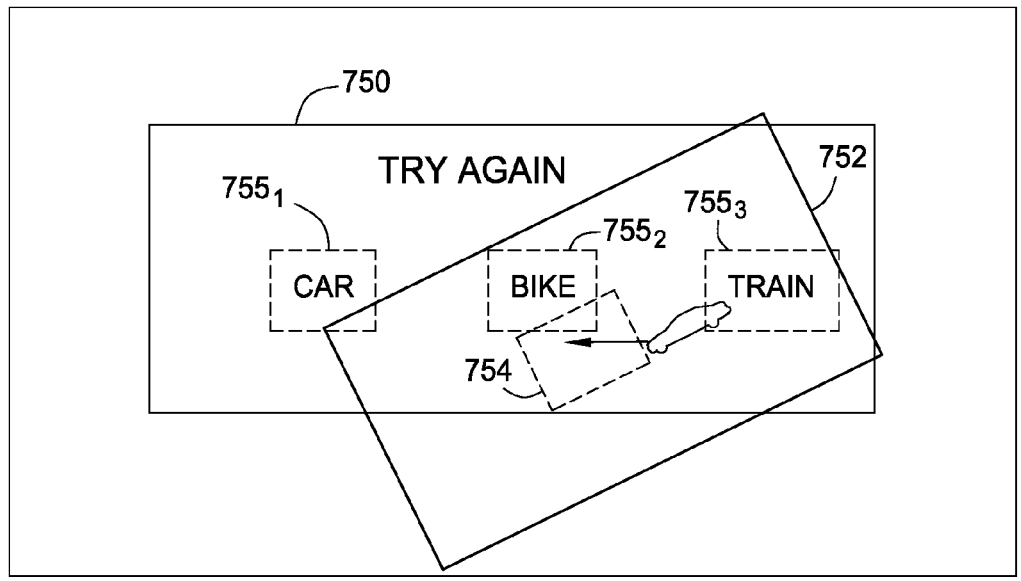
Figure 7C:
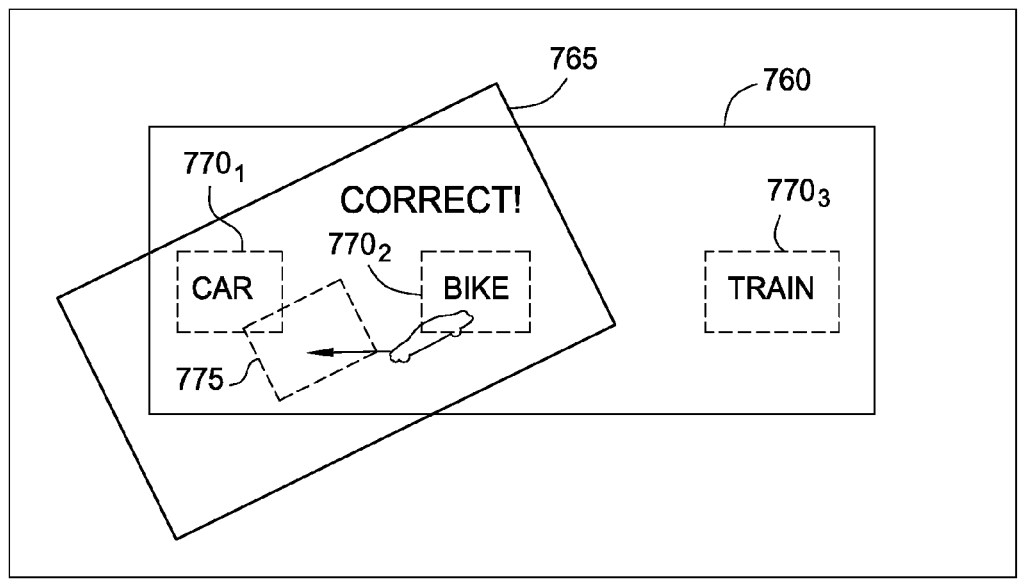

FIGS. 7B-7C illustrates another example of a side-by-side applications used to provide an educational game. As shown in FIG. 7B, a first projection image 750 includes three reference markers $755_{1-3}$, projected over three vocabulary words. A second projection frame 752 displays a picture matching one of the vocabulary words—in this case a car. The projection frame 752 also includes a reference marker 754 composited with an arrow. The user controlling the second projection frame positions the arrow over the vocabulary word matching the projected image. Illustratively, in FIG. 7B, the user has positioned the arrow next to the vocabulary word "bike." In response, the side-by-side application managing the first projection image 750 detects the reference marker 754, determines that the choice is incorrect, and displays the message "try again" in the first projection frame 750.

FIG. 7C continues with this example. As shown the first projection image 760 includes the three vocabulary words along with the near IR markers $770_{1-3}$. However, the user controlling the second projector has positioned the projection frame 765 such that the arrow (composited with the reference marker 775) points at the correct vocabulary term. In response, the side-by-side application managing the first projection image 765 detects the reference marker 775, determines that the choice is correct, and displays the message "Correct!" in the first projection frame 760. Thereafter, the side-by-side application managing the first projection image could project an event marker indicating a correct choice had been made and project a new set of vocabulary terms. And in response, the second side-by-side application managing the second projection image (i.e., the second projector could) could update the image projected to include a display of an icon matching one of the terms (i.e., it could replace the car with something else).

Note however, the examples of FIG. 7A-7C are included to illustrate different approaches for using near IR markers in projection images to allow multiple users to interact with one another using handheld projectors without requiring an instrumented display environment, and without disrupting the visual appearance of the display images with control data. Of course, one of ordinary skill in the art will recognize that a broad variety of applications may be developed using the approaches described above, in addition to the Examiners shown in FIGS. 7A-7C.

Figure 8:
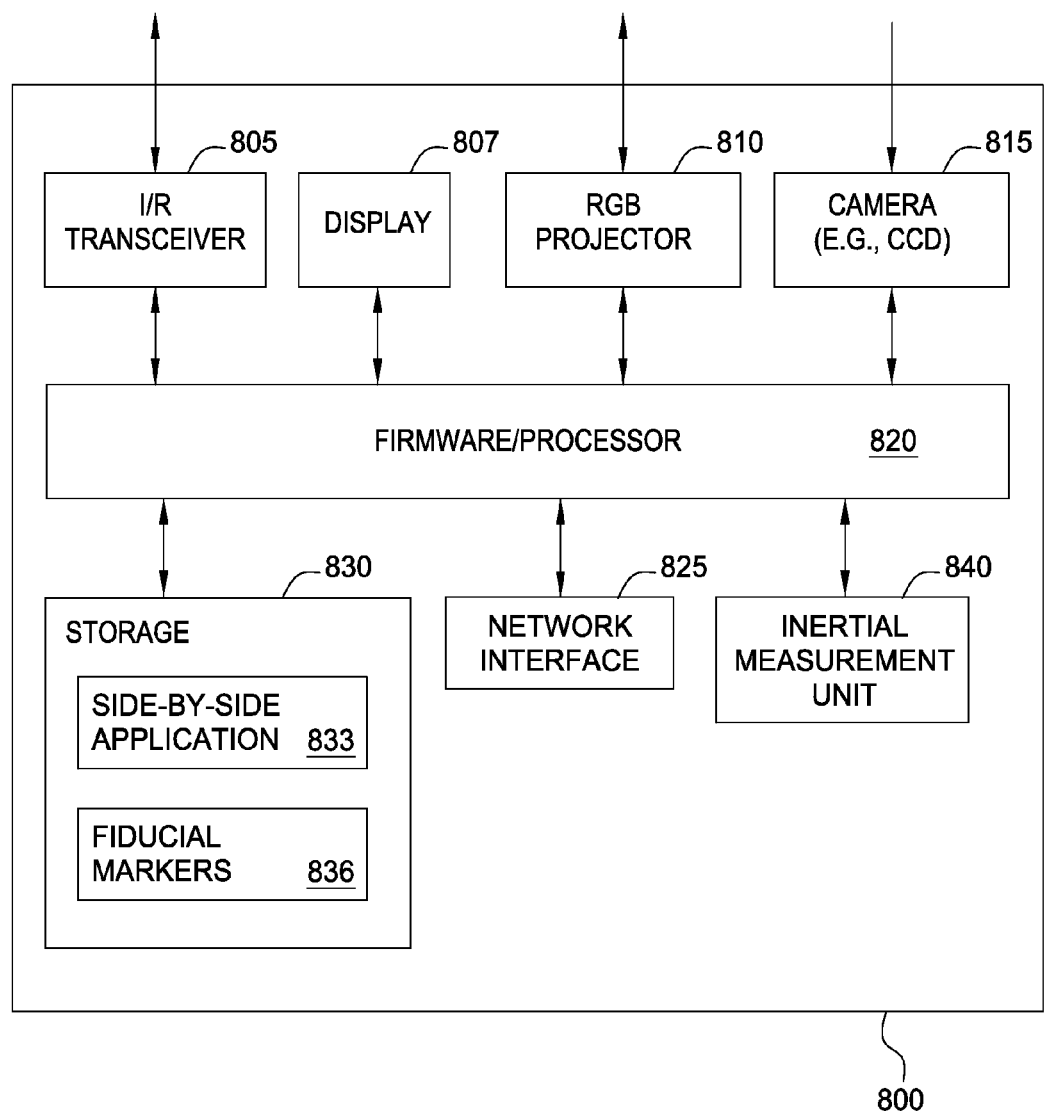
FIG. 8 illustrates an example of a handheld projector integrated with a computing device, according to one embodiment of the invention.

FIG. 8 illustrates an example of a handheld projector integrated with a computing device, according to one embodiment of the invention. In this example, the handheld projector 800 is illustrated as a handheld projector integrated with a handheld or mobile computing device (e.g., a mobile telephone or computing tablet). As shown, the handheld projector 800 includes, without limitation, an IR transceiver 805, a display 807, a network interface 825, a camera 815, an RGB projector unit 810, inertial measurement unit 840, a firmware/processor 820, memory and data storage 830. In addition, the handheld projector 800 may also include a variety of sensing and/or signaling components, allowing handheld projector 800 to monitor the environment and objects in the environment. For example, the handheld projector 800 may include combinations of the IR transceiver 805, a temperature monitor, a microphone, an ultrasonic range finder, a light sensor, the camera 815, a radio frequency (RF) monitor, a laser scanner, etc., as well as include signaling components used for data communications in addition to the network interface 825, e.g., an RF or Bluetooth transceiver, an RFID transmitter, etc.

The firmware/processor 820 retrieves and executes programming instructions stored in the memory and/or storage 830. Firmware/Processor 820 is included to be representative of a single CPU, multiple CPUs, a single CPU having multiple processing cores, GPUs having multiple execution paths, application specific integrated circuits (ASICs), field programmable gate arrays (FPGAs) and the like. Memory and storage 830 is generally included to be representative of a random access memory and/or a flash memory device, magnetic disk drive, etc. The network interface 825 may allow the handheld projector 800 to connect to data communications networks (e.g., wired Ethernet connection or an 802.11 wireless network). Note, although memory and storage 830 are illustrated as a single component, a handheld or mobile computing device may use a variety of integrated memory and storage architectures.

The handheld projector 800 may also include a display 807 used to provide a user interface. For example, the display 807 may provide a touch sensitive surface allowing the user to select different application programs (e.g., to select what side-by-side application to 833 execute). Alternatively or in addition the handheld projector 800 may include a set of buttons, switches or other physical device mechanisms for controlling the handheld projector 800. For example, the handheld projector 800 could include a set of directional buttons (as shown in FIG. 3) used to navigate a menu presented on display 807 (or projected by RGB projector 810). In such a case, the menu could allow users to select what side-by-side application 833 program to execute. Additionally, the user interface could allow users to select, purchase or otherwise obtain data used by the side-by-side application 833 to download different side-by-side applications 833 as well as different characters or graphics.

The IR transceiver 805 allows the handheld projector 800 to send and receive signals to/from the physical environment in which the handheld projector 800 is being used. For example, the IR transceiver 805 may project a fiducial marker 836 used as a tracking in the center of each visible display frame projected by the RGB projector 810. Such a tracking signal may be sensed by other handheld projection devices and used to derive relative position and orientation of multiple projection frames. Further the IR transceiver 805 may project event markers used by a given side-by-side application 833.

Inertial measurement unit 840 provides components that measure acceleration of the handheld projector 800, i.e., acceleration of the handheld projector 800 relative to freefall. In one embodiment, the accelerometers may be used to monitor magnitude and/or direction of the acceleration of the handheld device 800 as a vector quantity at a specified rate, e.g., the accelerometers in some currently available handheld devices operate at rate of 100 Hz. Data from the inertial measurement unit 840 may be stored and accessed by side-by-side applications 833 programs on the handheld projector 800 while projecting a virtual environment on a projection surface. For example, data from the inertial measurement unit 840 may be used to detect gestures performed by the user to control the side-by-side application 833. An example was described above using a quick up (or downward) motion to scroll through a list of files projected by handheld projector 800.

The camera 815 may provide a CCD device configured to capture still-images and video stored in data storage 830. In one embodiment, side-by-side applications 800 may use the camera 815 to learn about the physical environment. Similarly, the camera 800 could be used to recognize objects in the environment, and once recognized, trigger changes in the projected image. For example, in one embodiment, an image analytics application may be configured to analyze images captured using the camera 815, and update, change, or modify the virtual environment projected by the side-by-side application 833 (in conjunction with the use of reference and event markers). For example, as the user moves the display image across a surface, a analytics application could use the camera 815 to identity changes in surface angles and make perspective corrections to the projected image.

Advantageously, embodiments of the inventor provide a system designed for ad-hoc multi-user interaction with handheld projectors which do not require an instrumented environment and can be anywhere adequate lighting conditions are present. A device-mounted infrared (IR) camera and a hybrid visible/IR light projector is used to project visible animation sequences along with tracking signals imperceptible to the viewers. Alternatively, the tracking signals could be generated using ultraviolet (UV) markers imperceptible to the viewers. Similarly, the projected display images could be modified to include tracking signals, such as tracking signals encoded using steganographic techniques or tracking signals encoded in temporal light pulses.

A software (or firmware) platform (either on the handheld device or to which the device communicates) may track multiple, independent projected images in relation to one another using the tracking signals. The resulting system allows a broad range of interaction scenarios where users are not tied to a fixed location. Exchanging digital content, such as personal contact information or data files, e.g., can be initiated without any infrastructure in the display environment. Multiple users can play projected games together by creating ad-hoc gaming spaces. Interaction scenarios for education allow teachers and students to study together using a shared information space. These interaction scenarios can happen anywhere—in an elevator up to a business meeting, in a child's bedroom after lights out, or in the hallway outside a classroom.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for presenting display frames projected using a first handheld projector, the method comprising:
   generating a first display frame providing a visible image to project from the first handheld projector and at least a first a first tracking signal to composite with the first display frame;
   projecting the first display frame composited with at least the first tracking signal onto a display surface;
   detecting at least a second tracking signal within a field of view of a sensor on the first handheld projector, wherein the second tracking signal is projected on the display surface by a second handheld projector;
   determining, from the first and second tracking signals, a relative position of the first display frame and a second display frame;
   generating one or more subsequent display frames to project from the first handheld projector, wherein each subsequent display frame includes at least the first tracking signal, and wherein the one or more subsequent display frames are responsive, at least in part, to the relative positions of the first and second tracking signals; and
   generating, by the first handheld projector, at least a third tracking signal to composite with the first display frame, wherein the third tracking signal communicates a program event state to the second handheld projector.

2. The method of claim 1, wherein the first handheld projector includes an inertial motion unit, and wherein the third tracking signal is generated in response to gestures sensed by the inertial motion unit.

3. The method of claim 1, wherein the first handheld projector includes an inertial motion unit, and wherein at least one of the one or more subsequent display frames are responsive, at least in part, to gestures sensed by the inertial motion unit.

4. The method of claim 1, further comprising, detecting, by the second handheld projector, the third tracking signal wherein the third tracking signal is projected on the display surface by the first handheld projector, and wherein the third tracking signal communicates the program event state to the second handheld projector.

5. The method of claim 1, wherein detecting at least the second tracking signal comprises obtaining, from the sensor, an image of the field of view, and wherein the method further comprises, subtracting the first tracking signal from the image of the field of view.

6. The method of claim 1, wherein the first and second tracking signals are projected as near infrared (IR) images which are imperceptible to viewers of the first and second display frames.

7. The method of claim 1, wherein the first tracking signal is projected in the center of the first display frame and the second tracking signal is projected in the center of the second display frame.

8. The method of claim 1, wherein detecting at least the second tracking signal comprises obtaining, from the sensor, an image of the field of view, and wherein the method further comprises, storing a representation of the first tracking signal, as depicted in the image of the field of view.

9. A non-transitory computer readable-readable storage medium storing instructions that, when executed by a processor, perform an operation for presenting display frames projected using a first handheld projector, the operation comprising:
   generating a first display frame providing a visible image to project from the first handheld projector and at least a first tracking signal to composite with the first display frame;
   projecting the first display frame composited with at least the first tracking signal onto a display surface;
   detecting at least a second tracking signal within a field of view of a sensor on the first handheld projector, wherein the second tracking signal is projected on the display surface by a second handheld projector;
   determining, from the first and second tracking signals, a relative position of the first display frame and a second display frame;
   generating one or more subsequent display frames to project from the first handheld projector, wherein each subsequent display frame includes at least the first tracking signal, and wherein the one or more subsequent display frames are responsive, at least in part, to the relative positions of the first and second tracking signals; and
   generating, by the first handheld projector, at least a third tracking signal to composite with the first display frame, wherein the third tracking signal communicates a program event state to the second handheld projector.

10. The computer readable-readable storage medium of claim 9, wherein the first handheld projector includes an inertial motion unit and wherein the third tracking signal is generated in response to gestures sensed by the inertial motion unit.

11. The computer readable-readable storage medium of claim 9, wherein the first handheld projector includes an inertial motion unit, and wherein at least one of the one or more subsequent display frames are responsive, at least in part, to gestures sensed by the inertial motion unit.

12. The computer readable-readable storage medium of claim 9, wherein the operation further comprises, detecting, by the second handheld projector, the third tracking signal, wherein the third tracking signal is projected on the display surface by the first handheld projector, and wherein the third tracking signal communicates the program event state to the second handheld projector.

13. The computer readable-readable storage medium of claim 9, wherein detecting at least the second tracking signal comprises obtaining, from the sensor, an image of the field of view, and wherein the operation further comprises, subtracting the first tracking signal from the image of the field of view.

14. The computer readable-readable storage medium of claim 9, wherein the first and second tracking signals are projected as near infrared (IR) images which are imperceptible to viewers of the first and second display frames.

15. The computer readable-readable storage medium of claim 9, wherein the first tracking signal is projected in the center of the first display frame and the second tracking signal is projected in the center of the second display frame.

16. The computer readable-readable storage medium of claim 9, wherein detecting at least the second tracking signal comprises obtaining, from the sensor, an image of the field of view, and wherein the operation further comprises, storing a representation of the first tracking signal, as depicted in the image of the field of view.

17. A system, comprising:
   a first handheld projector, a processor;

a sensor; and a memory storing an application program, which, when executed on the processor, performs an operation for presenting display frames projected using the first handheld projector, the operation comprising:

generating a first display frame providing a visible image to project from the handheld projector and at least a first tracking signal to composite with the first display frame, projecting the first display frame composited with at least the first tracking signal onto a display surface, detecting at least a second tracking signal within a field of view of the sensor on the first handheld projector, wherein the second tracking signal is projected on the display surface by a second handheld projector, determining, from the first and second tracking signals, a relative position of the first display frame and a second display frame, and generating one or more subsequent display frames to project from the first handheld projector, wherein each subsequent display frame includes at least the first tracking signal, and wherein the one or more subsequent display frames are responsive, at least in part, to the relative positions of the first and second tracking signals; and generating, by the first handheld projector, at least a third tracking signal to composite with the first display frame, wherein the third tracking signal communicates a program event state to the second handheld projector.

18. The system of claim 17, wherein the first handheld projector includes an inertial motion unit and wherein the third tracking signal is generated in response to gestures sensed by the inertial motion unit.

19. The system of claim 17, wherein the first handheld projector includes an inertial motion unit, and wherein at least one of the one or more subsequent display frames are responsive, at least in part, to gestures sensed by the inertial motion unit.

20. The system of claim 17, wherein the operation further comprises, detecting, by the second handheld projector, the third tracking signal, wherein the third tracking signal is projected on the display surface by the first handheld projector, and wherein the third tracking signal communicates the program event state to the second handheld projector.

21. The system of claim 17, wherein detecting at least the second tracking signal comprises obtaining, from the sensor, an image of the field of view, and wherein the operation further comprises, subtracting the first tracking signal from the image of the field of view.

22. The system of claim 17, wherein the first and second tracking signals are projected as near infrared (IR) images which are imperceptible to viewers of the first and second display frames.

23. The system of claim 17, wherein the first tracking signal is projected in the center of the first display frame and the second tracking signal is projected in the center of the second display frame.

24. The system of claim 17, wherein detecting at least the second tracking signal comprises obtaining, from the sensor, an image of the field of view, and wherein the operation further comprises, storing a representation of the first tracking signal, as depicted in the image of the field of view.

25. A computer-implemented method for multi-user interaction with handheld projectors, the method comprising:

projecting, by at least a first handheld projector, a first set of display images on a projection surface;

projecting, by the first handheld projector, a first tracking signal and a second tracking signal on the projection surface, wherein the first and second racking signals are imperceptible to viewers of the set of display images projected by the first handheld projector, wherein a second tracking signal communicates a program event state to the second handheld projector, wherein the second handheld projector projects a second set of display images on the projection surface, and wherein the second handheld projector is configured to detect the first tracking signal projected by the first handheld projector.

26. The method of claim 25, wherein the second handheld projector is configured to project a third tracking signal on the projection surface, and wherein the method further comprises:

determining, from the third tracking signal projected by the second handled projector, by the first handheld projector, a position and orientation of a display frame of the second set of display images relative to a display frame of the first set of display images.

* * * * *

UNITED STATES PATENT AND TRADEMARK OFFICE
CERTIFICATE OF CORRECTION

| | | |
|---|---|---|
| PATENT NO. | : 8,902,158 B2 | Page 1 of 1 |
| APPLICATION NO. | : 13/278974 | |
| DATED | : December 2, 2014 | |
| INVENTOR(S) | : Willis et al. | |

It is certified that error appears in the above-identified patent and that said Letters Patent is hereby corrected as shown below:

In the Claims:

Column 13, Claim 1, Line 13, please delete "a first" after first;

Column 15, Claim 17, Line 8, please insert --first-- after the;

Column 16, Claim 25, Line 26, please delete "racking" and insert --tracking-- therefor;

Column 16, Claim 25, Line 28, please delete "a" and insert --the-- therefor;

Column 16, Claim 25, Line 30, please delete "the" and insert --a-- after to.

Signed and Sealed this
Twelfth Day of May, 2015

Michelle K. Lee
*Director of the United States Patent and Trademark Office*